(12) United States Patent
Brouet et al.

(10) Patent No.: US 9,177,423 B2
(45) Date of Patent: Nov. 3, 2015

(54) DATA PROCESSING METHOD FOR TRANSFORMING A FIRST 3D SURFACE SUITABLE FOR COATING A FIRST OBJECT INTO A SECOND 3D SURFACE SUITABLE FOR COATING A SECOND OBJECT, AND ASSOCIATED COMPUTER PROGRAM AND PROCESSING DEVICE

(71) Applicants: Inria Institut National de Recherche en Informatique et en Automatique, Le Chesnay (FR); Institut Polytechnique de Grenoble, Grenoble (FR); The University of British Columbia, Vancouver (CA)

(72) Inventors: Rémi Brouet, Grenoble (FR); Alla Sheffer, Vancouver (CA); Marie-Paule Cani, Meylan (FR); Laurence Boissieux, Saint-Egrève (FR)

(73) Assignee: Inria Institut National de Recherche en Informatique et an Automatique, Le Chesnay (FR)

( * ) Notice: Subject to any disclaimer, the term of this patent is extended or adjusted under 35 U.S.C. 154(b) by 0 days.

(21) Appl. No.: 14/401,714

(22) PCT Filed: May 21, 2013

(86) PCT No.: PCT/EP2013/060422
§ 371 (c)(1),
(2) Date: Nov. 17, 2014

(87) PCT Pub. No.: WO2013/174819
PCT Pub. Date: Nov. 28, 2013

(65) Prior Publication Data
US 2015/0131869 A1    May 14, 2015

(30) Foreign Application Priority Data

May 25, 2012  (FR) ..................... 12 54869

(51) Int. Cl.
*G06K 9/00* (2006.01)
*G06T 19/00* (2011.01)
(Continued)

(52) U.S. Cl.
CPC ........ *G06T 19/00* (2013.01); *A41H 3/08* (2013.01); *G06K 9/00362* (2013.01); *G06T 15/10* (2013.01); *G06T 17/00* (2013.01); *G06T 2210/16* (2013.01)

(58) Field of Classification Search
USPC ......... 382/100, 103, 108, 112, 123, 141, 154, 382/162, 168, 173, 181, 199, 209, 232, 254, 382/274, 276, 284–291, 295, 305, 312; 700/132, 133; 33/17 A; 345/473, 418
See application file for complete search history.

(56) References Cited

U.S. PATENT DOCUMENTS 5,850,222 A * 12/1998 Cone ............................. 345/418
2006/0212157 A1 * 9/2006 Watanabe ..................... 700/133

(Continued)

FOREIGN PATENT DOCUMENTS

WO    WO 2012061834    5/2012

OTHER PUBLICATIONS

Article—Bokeloh et al., "Pattern-Aware Shape Deformation Using Sliding Dockers,"*ACM Transactions on Graphics*, vol. 30, No. 6, Article 123, Dec. 2011, pp. 123:1-123:10.

(Continued)

*Primary Examiner* — Seyed Azarian
(74) *Attorney, Agent, or Firm* — Dority & Manning, P.A.

(57) ABSTRACT

Processing method for transforming a first surface into a second surface, according to which: a/ in a $(k+1)^{th}$ iteration step, for each couple comprising a first elementary surface and a second elementary surface transformed from the first elementary surface in iteration k, the projection of the second elementary surface on the plane of the first elementary surface is determined and a matrix (A) is defined for said couple, where $(A)=p_k^t \cdot (p^t)^{-1}$ and $p^t=[p_{n+1}-p_i]_{i=1 \text{ to } n}$, $p_k^t=[p'_{n+1,k}-p'_{i,k}]_{i=1 \text{ to } n}$; b/ the second elementary surfaces obtained for the $(k+1)^{th}$ iteration are determined as those minimizing a function including at least the term $E_{shape\_k+1}=$ (B).

$$\sum_{\substack{i_{k+1}^t \in S \\ T'_{k+1}}} \| \tilde{P}'_{k+1}(P')^{-1} - T'_{k+1} \|^2 \quad (B)$$

(A)

12 Claims, 4 Drawing Sheets

(51) Int. Cl.
  *G06T 17/00* (2006.01)
  *A41H 3/08* (2006.01)
  *G06T 15/10* (2011.01)
  *A41H 3/00* (2006.01)

(56) References Cited

U.S. PATENT DOCUMENTS

2009/0222127 A1* 9/2009 Lind ............................ 700/132
2013/0305547 A1* 11/2013 Grove ........................... 33/17 A
2014/0176565 A1* 6/2014 Adeyoola et al. ............. 345/473

OTHER PUBLICATIONS

Article—Kraevoy et al, "Non-homogeneous Resizing of Complex Models," *ACM Transactions on Graphics*, vol. 27, No. 5, Article 111, Dec. 2008, pp. 111:1-111:9.

Article—Li et al., "Customizing 3D garments based on volumetric deformation," *Computer in Industry*, vol. 62, 2011, pp. 693-707.

Article—Meng et al., "Flexible shape control for automatic resizing of apparel products," *Computer-Aided Design*, vol. 44, 2012, pp. 68-76.

Article—Sheffer et al., "ABF++: Fast and Robust Angle Based Flattening," *ACM Transactions on Graphics*, vol. 24, No. 2, Apr. 2005, pp. 311-330.

Article—Sumner et al. "Deformation Transfer for Triangle Meshes," *ACM Transactions on Graphics*, vol. 23, Issue 3, Aug. 2004, pp. 399-405.

Article—Wang et al., "Design automation for customized apparel products," *Computer-Aided Design*, vol. 37, 2005, pp. 675-691.

Article—Wang et al., "Volume Parameterization for Design Automation of Customized Free-Form Products," *IEEE Transactions on Automation Science and Engineering*, vol. 4, No. 1, Jan. 2007, pp. 11-21.

International Search Report for PCT/EP2013/060422 dated Sep. 20, 2013, 6 pages.

* cited by examiner

DATA PROCESSING METHOD FOR TRANSFORMING A FIRST 3D SURFACE SUITABLE FOR COATING A FIRST OBJECT INTO A SECOND 3D SURFACE SUITABLE FOR COATING A SECOND OBJECT, AND ASSOCIATED COMPUTER PROGRAM AND PROCESSING DEVICE

CROSS REFERENCE TO RELATED APPLICATION

This application is the national stage entry of International Patent Application No. PCT/EP2013/060422 having a filing date of May 21, 2013, which claims priority to and the benefit of French Patent Application No. 12/54869 filed in the French Intellectual Property Office on May 25, 2012, the entire contents of which are incorporated herein by reference.

The present invention relates to a data processing method for transforming a first 3D (3 dimensions) surface which is adapted to cover a first object and is formed of a mesh of first 2D (2 dimensions) elementary surfaces into a second 3D surface which is adapted to cover a second object and is formed of a mesh of second 2D elementary surfaces.

Such data processing methods are used, for example, to determine, starting from a person, called the "source person", dressed in a garment, called the "source garment", and another person, called the "target person", of a different size to the source person, a garment, called the "target garment", which corresponds to the source garment but is adapted to the size of the target person, the target/source persons and garments all being defined by numerical data.

In one process, especially a manual process, which requires considerable know-how, tailors adapt a 2D pattern of the garment according to the changes between the source and target persons in the region of key distances: for example in the region of the hips, the waist, the length of the arms, etc.

There are automatic systems for assisting with the adaptation (see, for example, MOORE C. L., MULLET K. K., and YOUNG M. B. P. 2001, Concepts of Pattern Grading: Techniques for Manual and Computer Grading, Fairchild Books And Visuals), but they only provide certain correspondences in tables and do not allow a tailor's know-how to be dispensed with. Furthermore, they are scarcely suitable for virtual persons which, typically, do not comply with the size tables of standard bodies.

Techniques called "skinning" are also used to adapt real or virtual garments in 3D: see, for example, WANG C. C. L., WANG Y., and YUEN M. M. F. 2005. Design automation for customized apparel products, Comput. Aided Des. 37, 675-691, or WANG C. C. L., C. HUI K., and M. TONG K. 2007, Volume parameterization for design automation of customized free-form products, submitted for IEEE Transactions on Automation Science and Engineering 4, 11-21). However, as indicated in MENG Y., WANG C.C., and JIN X. 2012, flexible shape control for automatic resizing of apparel products, Computer-Aided Design 44, 1, 68-76, these techniques alter the shapes of loose garments significantly and impair both the conformity to the initial model and the credibility of the adapted garment.

In addition, in order to simplify the creation of virtual 3D content, there are transfer and resizing techniques for different types of data, for example for textures and geometric details, deformations or even animations. . . . In particular, geometry and deformation transfer techniques use a shape-preserving approach (see, for example, BEN-CHEN M., WEBER O., and GOTSMAN C. 2009, Spatial deformation transfer, Eurographics/ACM SIGGRAPH Symposium on Computer Animation). In order to resize models of manufactured objects in a realistic manner, one technique (KRAEVOY V., SHEFFER A., COHEN-OR D., and SHAMIR A. 2008, Non-homogeneous resizing of complex models, ACM Trans. Graph, 111) minimizes the changes of the surface normals. However, this method does not give satisfactory results in the transfer of virtual or real garments, as a result especially of the compromise which must be taken into account between the constraints of proportionality, credibility and shape.

Consequently, there is a need for a technique, called a transfer or calibration technique, which defines a covering which fits the proportions of a support object, for example a virtual person or a real person, starting from an initial covering serving as a model, which initial covering is adapted to the proportions of another support object, that is to say another virtual person or real person, and which especially is satisfactory when the covering comprises a garment.

To that end, according to a first aspect, the invention proposes a method of the type mentioned above, characterized in that it comprises a step of iterative processing in which the transformations of the first elementary surfaces into respective second elementary surfaces are determined by carrying out in an iterative manner steps in which:

a/ in a current $(k+1)^{th}$ iteration step, k being an integer greater than or equal to 0, for each of a plurality of couples comprising a first elementary surface and a second elementary surface derived from a transformation of the first elementary surface and having been obtained in the preceding iteration k, the projection of said second elementary surface on the plane of said first elementary surface is determined, and a current 2D transformation matrix $T_{k+1}^{t}$ is defined for said couple, where $T_{k+1}^{t} = p_{k}^{t'}(p^{t})^{-1}$ and $p^{t} = [p_{n+1} - p_{i}]_{i=1 \text{ to } n}$, $p_{k}^{t'} = [p'_{n+1,k} - p'_{i,k}]_{i=1 \text{ to } n}$;

wherein $p_i$, for i=1 to n, are the vertices of the first elementary surface t of the couple and $p_{n+1}$ is obtained by offsetting the vertex $p_1$ by a normal vector of given norm to said first surface;

wherein $(p^{t})^{-1}$ is the inverse of the matrix $p^{t}$ when the first elementary surfaces are triangles and is a pseudo-inverse matrix of the matrix $p^{t}$ otherwise;

wherein $p'_{i,k}$, for i=1 to n, are the vertices of said projection of the second elementary surface and $p'_{n+1,k}$ is obtained by offsetting the vertex $p'_{1,k}$ of said normal vector;

b/ the second elementary surfaces obtained for the $(k+1)^{th}$ iteration are determined as those minimizing a function including at least the term $$E_{shape\_k+1} = \sum_{\tilde{t}_{k+1} \in S} \left\| \tilde{p}_{k+1}^{t}(P^{t})^{-1} - T_{k+1}^{t} \right\|^{2},$$

wherein S is a set of second elementary surfaces $\tilde{t}_{k+1}$ determined in step k+1;

$T_{k+1}^{t}$ are the transformation matrices defined in step a/ of the $(k+1)^{th}$ iteration;

$\tilde{p}_{k+1}^{t} = [\tilde{p}_{n+1,k+1} - \tilde{p}_{i,k+1}]_{i=1,\ldots,n}$;

wherein $\tilde{p}_{i,k+1}$, for i=1 to n, are the vertices of the second elementary surface $\tilde{t}_{k+1}$ as determined in the $(k+1)^{th}$ iteration and $\tilde{p}_{n+1,k+1}$ is obtained by offsetting the vertex $\tilde{p}_{1,k+1}$ by a vector of said given norm normal to said second elementary surface $\tilde{t}_{k+1}$.

A method according to the invention gives very satisfactory results relative to data defining garments to be calibrated according to the sizes of the persons who are to wear them, but also relative to any type of surface element which is to cover structures of various sizes, for example a shoe, a hat or a bag on a model of a person, or an envelope (of paper, plastics or other material) around any object which is to be resized.

In embodiments, the method according to the invention further comprises one or more of the following features:
the method comprises the following steps carried out for each vertex of a first elementary surface in an initialization step of the iterative processing, in order to define a second elementary surface for said first elementary surface, the first and second objects each being defined by data defining bone points of an object animated skeleton and object envelope points, an isomorphism function establishing correspondence between said points of the first object and said points of the second object:

i/ a pair of points is determined for each bone of a plurality of bones of the skeleton of the first object, comprising a first point determined as being the point of said bone that is closest to the vertex and comprising a second point determined as being the point of the envelope of the first object that is situated in the segment joining the vertex and said first point, and being closest to said vertex;

ii/ there is selected from said pairs determined for respective bones at least one pair, called the pair of first and second points of reference for said vertex of the first elementary surface, said selected pair corresponding to a minimum of a function including as variables the distance between said vertex of the first elementary surface and the second point of reference of a pair and the scalar product between a unit vector collinear to the bone and the vector joining said vertex and the first point of the pair;

iii/ a vertex of the second elementary surface is defined as a function of the point resulting from the application of the isomorphism function to the second point of reference, said resultant point then being offset by a vector parallel to that connecting the two points resulting from the application of the isomorphism function to the first and second points of reference, the norm of said vector being a function of the norm of the vector joining said vertex of the first surface and the second point of reference;

in step ii/, said function representing the norm is equal to $$\|pm, pi\| \times e^{\frac{\langle v_b, v \rangle^2}{\sigma^2}},$$

wherein $\sigma$ is a constant value, $p_m$ is the second point of a pair, $p_i$ is said vertex of the first surface, $v_b$ is the unit vector collinear to the bone, and v is the vector joining said vertex and the first point of the pair;

in step iii/, the vertex of the second surface is defined as being equal to $\tilde{p}_m + \|p_m, p_i\| \cdot v_{bm}$,
$p_i$ being said vertex of the first elementary surface;
$\tilde{p}_m$ being the point resulting from the application of the isomorphism function to the second point of reference;
$v_{bm}$ being a unit vector parallel to the segment $[\tilde{p}_b, \tilde{p}_m]$, $\tilde{p}_b$ being the point resulting from the application of the isomorphism function to the first point of reference;

if two reference pairs are selected in step iii, the vertex of the second surface is defined as being equal to $w_1 \cdot \tilde{p}_{i1} + w_2 \cdot \tilde{p}_{i2}$,
where $w_1$ and $w_2$ are greater than 0 and $w_1 + w_2 = 1$
$\tilde{p}_{i1} = \tilde{p}_{m1} + \|p_{m1}, p_i\| \cdot V_{bm1}$ and $\tilde{p}_{i2} = \tilde{p}_{m2} + \|p_{m2}, p_i\| \cdot V_{bm2}$;
$p_i$ being said vertex of the first elementary surface;

$\tilde{p}_{mn}$ being the point resulting from the application of the isomorphism function to the second point of reference of the $n^{th}$ reference pair, n=1 or 2;
$v_{bmn}$ being a unit vector parallel to the segment $[\tilde{p}_{bn}, \tilde{p}_{mn}]$, $\tilde{p}_{bn}$ is the point resulting from the application of the isomorphism function to the first point of reference of the $n^{th}$ reference pair;

$$-w_1 = \frac{\arctan((5 * (z - 0.5) + \frac{\pi}{2})}{\pi}$$

wherein z is the coordinate of the projection of the vertex $p_i$ on the segment connecting the two points of reference $p_{b1}$ and $p_{b2}$, $p_{b1}$ being considered as the zero coordinate point;

in step b/, the function to be minimized includes at least $E_{shape\_k+1} + E_{rl\_k+1}$, where $$E_{rl\_k+1} = \sum_{\tilde{t}_{k+1}} \sum_{\tilde{p}_{i,k+1} \in \tilde{t}_{k+1}} \alpha_i (\langle \tilde{p}_{i,k+1} - \tilde{p}_{i,0}, d_b \rangle^2 + \langle \tilde{p}_{i,k+1} - \tilde{p}_{i,0}, d_t \rangle^2),$$

wherein T is a set of second elementary surfaces $\tilde{t}_{k+1}$ determined in iteration k+1;
each $\tilde{p}_{i,0}$ is a second elementary surface vertex defined in iii/ for a vertex $p_i$ of a first elementary surface;
$\alpha_i$ is a value which is constant for the vertices $\tilde{p}_{i,k+1}$ of a same second elementary surface $\tilde{t}_{k+1}$;
$d_b$ is the unit vector collinear to the bone for which the selected pair of first and second points of reference has been determined, and, $d_q$ being the unit vector collinear to $(p_b, \tilde{p}_{i,0})$, the unit vector $d_t$ is equal to the vector product of the vectors $d_b$ and $d_q$;
the values of $\alpha_i$ for elementary surfaces in adjusted zones of the surface on the object are chosen in the range [0, 10];
the values of $\alpha_i$ are chosen in the range [10; +∞] in the other zones of said surface;

in step b/, the function to be minimized includes at least $E_{shape\_k+1} + E_{fit\_k+1}$, where $$E_{fit\,k+1} = \beta \sum_{\tilde{t}_{k+1} \in F} \sum_{\tilde{p}_{i,k+1} \in \tilde{t}_{k+1}} \langle \tilde{p}_{i,k+1} - \tilde{p}_{i,0}, d_q \rangle^2$$

wherein $\beta$ is a constant,
F is a set of second elementary surfaces $\tilde{t}_{k+1}$ determined in iteration k+1 and situated in adjusted zones of the surface on the object, said second elementary surfaces determined as being found in F then being removed from the set S;
each $\tilde{p}_{i,0}$ is a second elementary surface vertex defined in iii/ for the vertex $p_i$ of a first elementary surface;
$d_b$ is the unit vector collinear to the bone for which the selected pair of first and second points of reference has been determined, and, $d_q$ being the unit vector collinear to $(p_b, \tilde{p}_{i,0})$, the unit vector $d_t$ is equal to the vector product of the vectors $d_b$ and $d_q$;
$\beta$ is a constant chosen in [10; +∞].

According to a second aspect, the present invention proposes a computer program which is to be installed in a data processing device for transforming a first 3D surface which is adapted to cover a first object and is formed of a mesh of first 2D elementary surfaces into a second 3D surface which is adapted to cover a second object and is formed of a mesh of second 2D elementary surfaces, said program comprising instructions for carrying out the steps of a method according to the first aspect of the invention during execution of the program by computing means of said device.

According to a third aspect, the present invention proposes a data processing device for transforming a first 3D surface which is adapted to cover a first object and is formed of a mesh of first 2D elementary surfaces into a second 3D surface which is adapted to cover a second object and is formed of a mesh of second 2D elementary surfaces, said processing device being adapted to determine transformations of the first elementary surfaces into respective second elementary surfaces and comprising:

a supervisor adapted to run iteratively a set of modules comprising a first updating module and a second updating module;

the first updating module adapted to, in a $(k+1)^{th}$ iteration operation, k being an integer greater than or equal to 0, for each of a plurality of couples comprising a first elementary surface and a second elementary surface derived from a transformation of the first elementary surface and having been delivered by the second updating module following the $k^{th}$ iterative operation of the supervisor, determine the projection of said second elementary surface on the plane of said respective elementary surface and define a current 2D transformation matrix $T_{k+1}^{t}$ for said couple, where $T_{k+1}^{t} = P_k^{t'1}(P^t)^{-1}$ and $P^t = [p_{n+1} - p_i]_{i=1\ to\ n}, P_k^{t'1} = [p'_{n+1,k} - p'_{i,k}]_{i=1\ to\ n}$;

wherein $p_i$, for i=1 to n, are the vertices of the first elementary surface t of a couple and $p_{n+1}$ is obtained by offsetting the vertex $p_1$ by a vector normal to said first surface, of given norm;

wherein $(p^t)^{-1}$ is the inverse of the matrix $p^t$ when the first elementary surfaces are triangles and is a pseudo-inverse matrix of the matrix $p^t$ otherwise;

wherein $p'_{i,k}$, for i=1 to n, are the vertices of said projection of the second elementary surface and $p'_{n+1,k}$ is obtained by offsetting the vertex $p'_{1,k}$ of said normal vector;

the second updating module adapted to, in a $(k+1)^{th}$ iteration operation by the supervisor, k being an integer greater than or equal to 0, determine the second elementary surfaces obtained for the $(k+1)^{th}$ iteration as those minimizing a function including at least the term $$\sum_t \|\tilde{P}_{k+1}^t (P^t)^{-1} - T_{k+1}^t\|^2,$$

wherein $T_{k+1}^{t}$ are the transformation matrices defined by the first module in the $(k+1)^{th}$ iteration operation by the supervisor;

where $\tilde{p}_{k+1}^{t} = [\tilde{p}_{n+1,k+1} - \tilde{p}_{i,k+1}]_{i=1,\ldots,n}$, wherein $\tilde{p}_{i,k+1}$, for i=1 to n, are the vertices of the second elementary surface of the couple as determined in the $(k+1)^{th}$ iteration and $\tilde{p}_{n+1,k+1}$ is obtained by offsetting the vertex $\tilde{p}_{1,k+1}$ by a vector normal to said second surface, of given norm.

These features and advantages of the invention will become apparent upon reading the following description, which is given solely by way of example and with reference to the accompanying drawings, in which.

Figure 1:
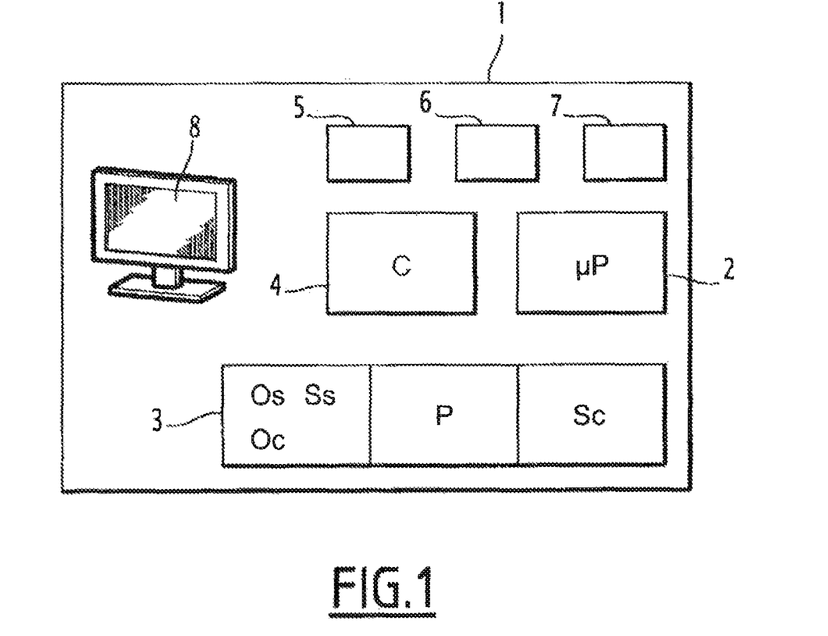
FIG. 1 shows a device in an embodiment of the invention.

FIG. 1 shows a device 1 in an embodiment of the invention, comprising a microprocessor 2, a memory 3, a controller 4, a first storage module 5, a second processing module 6 and a supervisor 7. In one embodiment, it further comprises a display screen 8.

The device 1 is adapted to store in its memory 3 data defining a 3D source surface, referenced Ss, and a 3D source object, referenced Os, such that the source surface Sc is adapted to "clothe" the outside surface of the source object Os.

The device 1 is adapted further to store in its memory 3 data defining a 3D target object, referenced Oc, and an isomorphism function $F_{cross}$ allowing a point of the source object Os to be matched to a point of the target object Oc, which is assumed to be known (see, for example, SHEFFER A., PRAUN E. and ROSE K. 2006, Mesh parameterization methods and their applications, Found. Trends. Comput. Graph. Vis. 2, 105-171, or CHANG Y.-T., CHEN B.-Y., LUO W.-C. and HUANG J.-B., volume parameterization, in Proceedings of Computer Graphics International 2006, 78-89) or methods consisting in using a deformation of the same mesh to represent the geometry of the source and target objects.

The memory 3 of the device 1 further comprises a computer program P comprising software instructions which, when they are executed on the microprocessor 2 under the supervision of the controller 4, carry out steps described below.

The device 1, by carrying out those steps, is adapted to determine data defining a 3D target surface, referenced Sc, adapted to clothe the target object Oc.

In the embodiment considered below, the data defining the source object Os are data that define points of the animated skeleton and points of the skin of a first person. The data defining the target object Oc are also data that define points of the skeleton and of the skin of a second person, whose morphology may be very different from that of the first person.

In the embodiment considered below, the source surface Ss corresponds to a garment clothing the source object Ss and is a surface composed of intermeshed triangles called the "source triangles". Each triangle is defined by its three vertices.

Likewise, the desired target surface Sc corresponds to a garment clothing the target object Sc and is a surface composed of intermeshed triangles called the "target triangles".

A balance between different criteria is to be taken into account for a satisfactory transfer operation, those criteria being especially the preservation of the shape of the initial garment, of the relative position and the fit between the garment and the person, of the manufacturable nature of the garment, and of non-collision.

Figure 5:
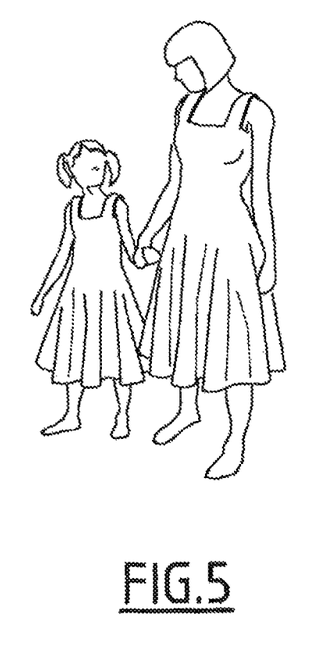
FIG. 5 shows the same garment, the shape of which has been adapted to two persons with different measurements.

The criterion of preservation of the shape of the initial garment allows the overall rendering of the initial garment to be maintained. For example, a straight skirt must still be a straight skirt after transfer, and the same is true for flared jeans. With reference to FIG. 5, which shows the same garment, the shape of which has been adapted to a mother and her daughter, important changes to the geometry other than simple scaling are necessary in order to adapt to the changed proportions while maintaining the directions normal to the different sections of the garment.

Proportionality, or the increase or reduction in size, requires that a transferred garment respects the relative position of the garment in relation to the limbs and the body of the person. For example, a knee-length skirt must remain at knee length independently of a change in the height of the person, a waistline of a dress must remain at waist level, and a side zip must remain at the side.

The criterion of preservation of the fit reflects the maintenance of the local distance between the garment and the person wearing it. There may be competition between this criterion and the criterion of preservation of shape, because this distance must sometimes be altered, especially in non-tight zones (i.e. distances between the garment and the person which are greater than a threshold representing the thickness of the fabric), in order to preserve the shape.

The garments are produced from flat panels of fabric. The criterion of manufacturable nature takes account of the fact that the fabric has limited stretchability.

Finally, when applied to transfers of garments between virtual persons, it must be ensured that the surface of the garment is modified in order to avoid collisions with the body of the person or interpenetrations between separate layers of clothing on the person.

Figure 2:
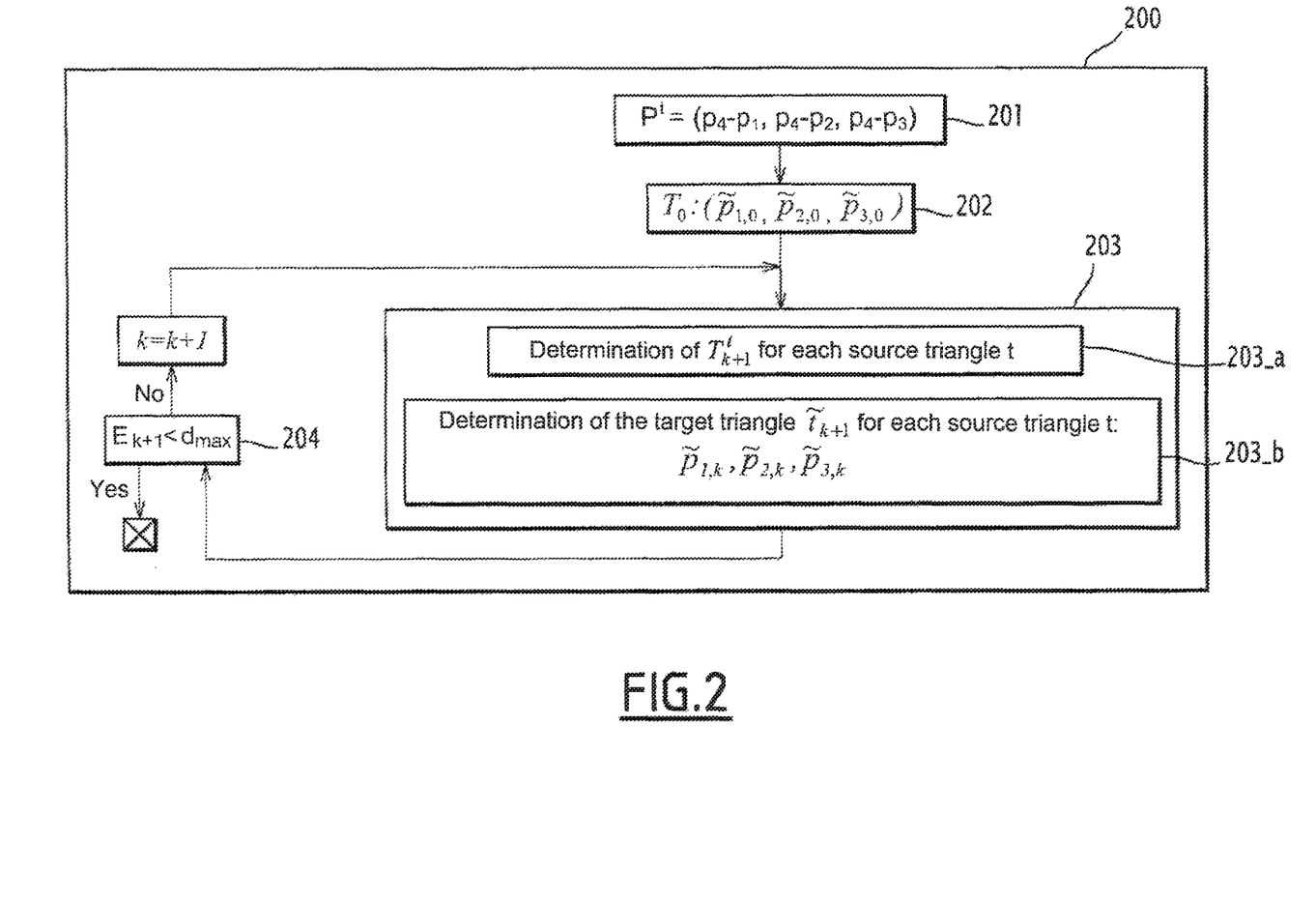
FIG. 2 shows steps of a method according to the invention.

In one embodiment, with reference to FIGS. 1 and 2, the first and second modules 5, 6 and the supervisor 7 are adapted to carry out steps which are described below in FIG. 2 following execution of software instructions of the program P on the microprocessor 2.

In a transformation operation 200 called "transformation as far as possible in 2D", steps 201 to 204 are carried out to calibrate the source surface Ss intended for the target object, defining iteratively a target surface Sc.

In a step 201, for each triangle t of the source surface Sc, if the vertices of the triangle t are named $p_1$, $p_2$, $p_3$, there is defined a matrix $P^t$, of size 3*3, representing a reference point local to the triangle t: $P^t = (p_4-p_1, p_4-p_2, p_4-p_3)$, wherein $p_4 = p_1 + \vec{n}$ and $\vec{n}$ is the unit vector normal to the triangle t. This reference point represents the triangle t in that it defines its plane, the length of its three sides and the angles which those sides form between them, but without taking into account the position of the triangle in space.

In a T0 initialization step 202 (k=0), the starting coordinates of the vertices of the triangles of the target surface Sb are initialized as a function of the source surface Ss and at least one target object. There is one, and only one, target triangle $\tilde{t}_0$ for a source triangle t.

This initialization is optionally also a function of the source object.

A form of this initialization is described hereinbelow.

For each source triangle t, the coordinates of the target triangle $\tilde{t}_0$ corresponding thereto on initialization are $\tilde{p}_{1,0}$, $\tilde{p}_{2,0}$ and $\tilde{p}_{3,0}$.

In an iterative step 203, an attempt will be made to modify as little as possible the normal of a target triangle $\tilde{t}$ (the triangle $\tilde{t}$ is the result of the transformation of the triangle t) relative to the normal of the source triangle t corresponding thereto, by minimization of the following formula:

$$E_{shape} = \sum_t \left\| \tilde{P}^t (P^t)^{-1} - T^t \right\|_F^2 \quad \text{(Form 1)}$$

wherein $\|\cdot\|_F$ is a matrix norm, for example the Frobenius norm;

the $$\text{sum} = \sum_t \text{ relates to each triangle } t \text{ of the source surface } Ss.$$

$\tilde{P}^t$ is the 3*3 matrix equal to $[\tilde{p}_4 - \tilde{p}_1, \tilde{p}_4 - \tilde{p}_2, \tilde{p}_4 - \tilde{p}_3]$, wherein $\tilde{p}_1, \tilde{p}_2, \tilde{p}_3$ are the vertices of the target triangle $\tilde{t}$ derived from the transformation of the source triangle t corresponding thereto, and $\tilde{p}_4 = \tilde{p}_1 + \vec{\tilde{n}}$, and $\vec{\tilde{n}}$ is the unit vector normal to the target triangle $\tilde{t}$; $\tilde{p}^t$ represents the local reference point obtained after transformation of the triangle t to $\tilde{t}$;

$(p^t)^{-1}$ is the inverse matrix of $\tilde{p}^t$;

$\tilde{p}^t (p^t)^{-1}$ represents the transformation between the source triangle t and the corresponding target triangle $\tilde{t}$; and $T^t$ is a corresponding transformation which is necessarily a 2D transformation, in the plane of the triangle t.

In order to solve the problem of minimization, an iterative technique of least squares is used, which alternates between updating each transformation $T^t$, while keeping $\tilde{P}^t$ fixed, and updating $\tilde{p}^t$ while this time considering the transformations $T^t$ to be fixed. The value obtained for the formula Form decreases between two successive iterations, which ensures the convergence of step 203.

Step 203 comprises sub-steps 203_a and 203_b carried out in a $(k+1)^{th}$ iteration, where k is an integer greater than or equal to 0.

There are named $\tilde{p}_{1,k}$, $\tilde{p}_{2,k}$, $\tilde{p}_{3,k}$ the vertices of the target triangle $\tilde{t}_k$ which are derived from the transformation of the triangle t as determined in the $k^{th}$ iteration of step 203.

There is a target triangle $\tilde{t}_k$ for each source triangle t.

This transformation is defined by the matrix $\tilde{P}_k^t (p^t)^{-1}$, wherein $\tilde{P}_k^t = [\tilde{p}_{4,k} - \tilde{p}_{1,k}, \tilde{p}_{4,k} - \tilde{p}_{2,k}, \tilde{p}_{4,k} - \tilde{p}_{3,k}]$, wherein $\tilde{p}_{4,k} = \tilde{p}_{1,k} + \vec{\tilde{n}}_k$, and $\vec{\tilde{n}}_k$ is the unit vector normal to the target triangle $\tilde{t}_k$ determined in the $k^{th}$ iteration.

A corresponding 2D transformation matrix $T_k^t$ has also been determined for each triangle t at the end of the $k^{th}$ iteration of step 203.

In a current iteration step k+1, during the sub-step 203_a carried out by the first module of the device 1, the corresponding 2D transformation matrix $T_{k+1}^t$ determined for each source triangle t.

To that end, the projection of each target triangle $\tilde{t}_k$ determined in iteration k on the plane of the corresponding source triangle t is carried out:

$p'_{i,k+1} = \tilde{p}_{i,k} - \langle \tilde{p}_{i,k}, \vec{n}^t \rangle \vec{n}^t$ wherein $\vec{n}^t$ is the unit vector normal to the triangle t, wherein the function $\langle ., . \rangle$ represents the scalar product and i=from 1 to 3.

The local reference point derived from this projection is $P_k'^t = [p'_{4,k} - p'_{1,k}, p'_{4,k} - p'_{2,k}, p'_{4,k} - p'_{3,k}]$, where $p'_{4,k} = p'_{1,k} + \vec{n}$, and $\vec{n}$ is the unit vector normal to the source triangle t.

There is then determined the corresponding 2D transformation matrix $T_{k+1}^t$ for the triangle t:

$$T_{k+1}^t = P_k'^t (P^t)^{-1}.$$

In the current iteration k+1 of the sub-step 203_b carried out by the second module, on the basis of the matrices $T_{k+1}^t$ so determined for the source triangles t, the target triangle for each source triangle t is updated.

To that end there are determined the target triangles $\tilde{t}_{k+1}$ permitting minimization of the following term, derived from the formula (Form 1):

$$E_{k+1} = E_{shape\ k+1} = \sum_t \left\| \tilde{P}^t_{k+1} (P^t)^{-1} - T^t_{k+1} \right\|^2 \quad \text{(Form } 1_{k+1})$$

wherein $\tilde{P}^t_{k+1} = [\tilde{p}_{4,k+1} - \tilde{p}_{1,k+1}, \tilde{p}_{4,k+1} - \tilde{p}_{2,k+1}, \tilde{p}_{4,k+1} - \tilde{p}_{3,k+1}]$, wherein $\tilde{p}_{4,k+1} = \tilde{p}_{1,k+1} + \vec{n}_{k+1}$, $\vec{n}_{k+1}$ being the unit vector normal to the target triangle $t_{k+1}$. This sum $$\sum_i$$

relates to all the triangles t of the source surface (or all the target triangles, each target triangle corresponding to a source triangle), or only to those verifying a given condition, as indicated below.

The matrices $T^t_{k+1}$ being known, the determination of the vertices $\tilde{p}_{1,k+1}, \tilde{p}_{2,k+1}, \tilde{p}_{3,k+1}$ of the target triangles $\tilde{t}_{k+1}$ t minimizing the quadratic equation (Form $1_{k+1}$) is reduced to the resolution of a simple linear system.

In one embodiment, since the positions of the vertices of the target triangle determined for each source triangle do not vary significantly from one iteration to the other, a resolution of the conjugate gradient type is used, with the positions determined in iteration k as the initial conditions.

In a step 204 carried out by the supervisor 7, an iteration stop condition is verified: if the value obtained for the term $E_{k+1}$ is below a fixed threshold $d_{max}$, the iterations are stopped, the final target surface Sc considered then being that constituted by the mesh of the target triangles $\tilde{t}_{k+1}$. Otherwise, a new iteration of step 203 is carried out.

Such an operation 200 allows the shape of the garment to be preserved in the best possible manner during its transfer between the persons, as well as its manufacturable nature.

In one embodiment, the initialization step 202 is performed in the manner described below with reference to FIG. 3, and can be considered to be an extension of a process of the "smooth skinning" type, in which the combinations of constant positions in the references of the skeleton would be replaced by combinations of constant offset vectors defined on the basis of a set of points of reference suitably chosen on the source object Os.

Accordingly, each vertex $p_i$ of a triangle t of the source surface Ss will be associated with a pair of points of reference $(p_b, p_m)$ situated on a bone of the skeleton and on the skin of the source person, respectively.

It has been determined by the applicant that selecting the point on the skin that is closest to the vertex $p_i$, as suggested by CORDIER F., SEO H. and MAGNENAT-THALMANN N. 2003, Made-to-measure technologies for an online clothing store, IEEE Computer Graphics and Applications 23, 38-48; or MENG Y., WANG C. C. and JIN X. 2012, Flexible shape control for automatic resizing of apparel products, Computer-Aided Design 44, 1, 68-76, is not necessarily the best choice because it will give rise to phenomena of slipping of the garment along the body of the target person.

According to the invention, in the initialization step 202, the chosen pairs of points of reference correspond to local minima of a function expressing the distance to the source person which gives preference to directions perpendicular to the local bone.

Accordingly, in a sub-step 202_a, for each vertex $p_i$ there is(are) determined the point(s) $p_{bj}$ closest to $p_i$ on each bone j (j=1 to J) of the skeleton of the source object (it will be noted that $p_b$ may be an end of a bone).

For each bone j, $p_{mj}$ is defined as being the point of the skin of the source person that is closest to the vertex and situated on the segment $[p_{bj}, p_i]$. Such a point $p_{mj}$ necessarily exists, since $p_{bj}$ is on the inside, and $p_i$ is on the outside, of the skin of the source person.

In order to select a pair of points of reference for a vertex $p_g$, both the distance between $p_i$ and each of the intersections $p_{mj}$ (j=1 to J) and also the angle between the axis of the bone $v_{bj}$ and the vector $v = p_i - p_{bj}$ are considered, because it is preferred that those two vectors are perpendicular.

Accordingly, one pair $(p_b, p_m)$ among the pairs $(p_{bj}, p_{mj})$ is thus selected as the reference for the vertex $p_i$ if it minimizes the following formula:

$$\| p_{mj}, p_i \| \times e^{\frac{\langle v_{bj}, v \rangle^2}{\sigma^2}},$$

wherein σ is a constant value, for example equal to 0.1.

In most cases, only one minimum exists. When there are two solutions giving an equal or very similar minimum, the two corresponding pairs are associated with the vertex $p_i$: this is typically the case in the zones between the legs of the person or under the arms.

Furthermore, for each pair $(p_b, p_m)$ selected as reference for the vertex $p_i$, the offset $o_i = \| p_m, p_i \|$ is further associated with the vertex $p_i$.

It will be noted that, in other embodiments, the formula to be minimized takes other forms, for example also function of $\| p_{mj}, p_i \|$ and of the scalar product $(v_{bj}, v)$.

In a sub-step 202_b, for each pair of points of reference $(p_b, p_m)$ so selected for a vertex $p_i$, the corresponding pair of points of reference $(\tilde{p}_b, \tilde{p}_m)$ on the target object Oc is determined by applying the isomorphism function $F_{cross}$:

$$\tilde{p}_b = F_{cross}(p_b) \text{ and } \tilde{p}_m = F_{cross}(p_m) \quad \text{(Eq 1)}$$

Then, in a sub-step 202_c, a vertex $\tilde{p}_{i,0}$ of the target surface Sc is defined for each vertex $p_i$ of the source surface Ss, which will then be considered in the initialization step 202 as a vertex of the target triangle $\tilde{t}_0$ corresponding to the source triangle t:

for each vertex $p_i$ of a triangle t of the source surface with which there is associated a single pair of points of reference $(p_b, p_m)$, $\tilde{p}_{i,0}$ is defined:

$$\tilde{p}_{i,0} = \tilde{p}_m + o_i \cdot v_{bm} \quad \text{(Eq 2)}$$

wherein $v_{bm}$ is a unit vector parallel to the segment $[\tilde{p}_b, \tilde{p}_m]$ For each vertex $p_i$ of a triangle t of the source surface with which there are associated two pairs of points of reference $(p_{b1}, p_{m1})$ and $(p_{b2}, p_{m2})$, there are obtained, with the aid of the equations (Eq 1) and (Eq 2) applied in succession to each of the two pairs, $\tilde{p}_{i,0,1}$ and $\tilde{p}_{i,0,2}$ ($\tilde{p}_{i,0,n} = F_{cross}(p_{m,n}) + \| p_{m,n}, p_i \| v_{bm}$ wherein $v_{bm}$ is a unit vector parallel to the segment $[F_{cross}(p_{bn}), F_{cross}(p_{mn})]$, and n=1 to 2);

$\tilde{p}_{g,0}$ is defined with the aid of a weighted sum of $\tilde{p}_{i,s,1}$ and $\tilde{p}_{i,0,2}$:

$$\tilde{p}_{i,0} = w_1 \tilde{p}_{i,0,1} + w_2 \tilde{p}_{i,0,2},$$

where $$w_1 = \frac{\arctan\left((5*(z-0.5)+\frac{\pi}{2}\right)}{\pi}$$

wherein z is the coordinate of the projection of the vertex $p_i$ on the segment connecting the two points of reference $p_{b1}$ and $p_{b2}$, $p_{b1}$ being considered as the zero coordinate point; and $w_2=1-w_1$.

Such a step 202 allows a version to be generated which is based on a proportional scaling starting from the source surface, and which satisfies the criteria of preservation of fit and of relative position (the criterion of preservation of shape being taken into account in step 203).

Figure 4:
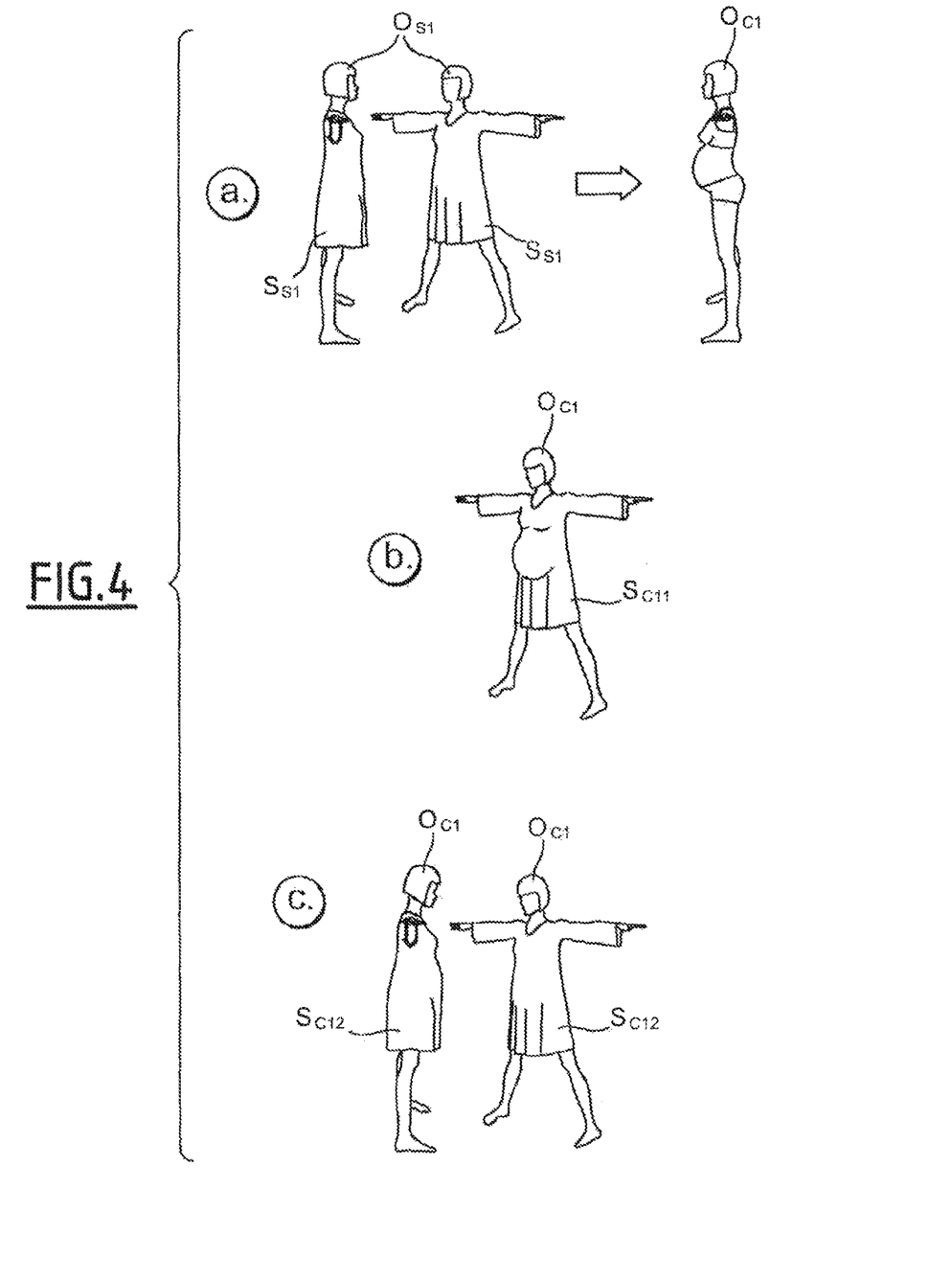
FIG. 4a shows source and target persons and a source garment in an embodiment of a method according to the invention.
FIG. 4b shows the target garment after step 202 shown in FIG. 3 has been carried out.
FIG. 4c shows the final target garment obtained in an embodiment of the invention.

By way of illustration, FIG. 4a shows a person, source object $O_{S1}$, covered with a garment $S_{S1}$, and a person $O_{C1}$, target object.

Figure 3:
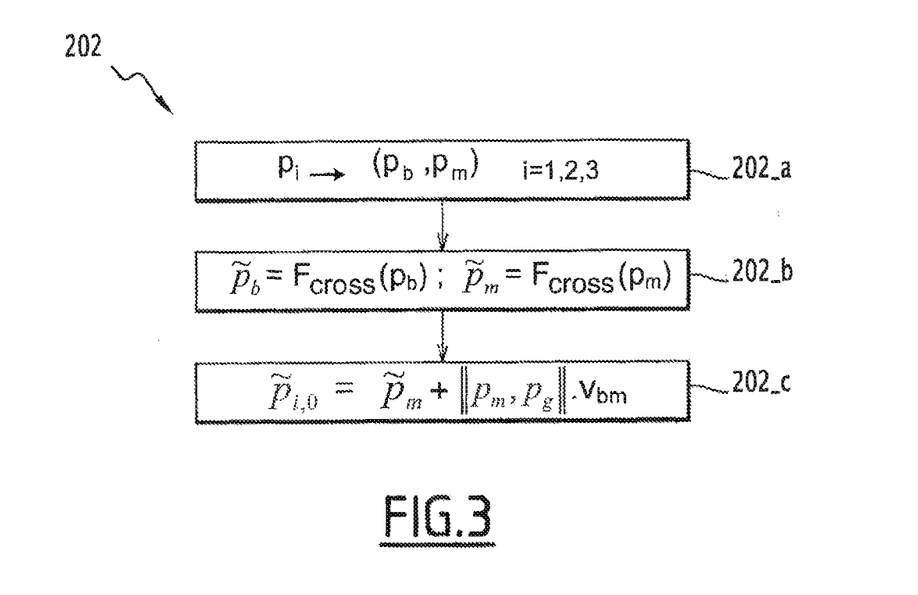
FIG. 3 shows steps of a method according to the invention.

In FIG. 4b, the person $O_{C1}$, target object, has been shown covered with the target garment $S_{C11}$ obtained after carrying out step 202 detailed above with reference to FIG. 3. The edges of the garment and other characteristic zones have retained their relative position in relation to the body and to the limbs of the person wearing it, while the use of the offsets $o_i$ preserves the fit, taking into account the changes in the shape of the bodies of the persons.

In FIG. 4c, the person $O_{C1}$, target object, has been shown covered with the target garment $S_{C12}$ obtained after carrying out step 200, taking the target garment $S_{C11}$ as the target initialization garment.

In one embodiment, there is taken into account in step 203 for the $(k+1)^{th}$ iteration, in addition to the criterion of preservation of shape, the criterion of preservation of the relative position and/or of fit.

To that end there is considered a local reference point defined by the relation between each initialization vertex $\tilde{p}_{i,0}$ determined for a vertex $p_i$ of a triangle t of the source surface Ss and the point of reference $p_b$, on the skeleton, determined for the vertex $p_i$ (see steps 202_a to 202_c). This reference point includes the unit vector $d_b$ parallel to the bone corresponding to the pair of points of reference selected in sub-step 202_a, the unit vector $d_q$ collinear to $(p_b, \tilde{p}_{i,0})$, and the unit vector $d_t$ equal to the vector product of the vectors $d_b$ and $d_q$ (by construction $d_q$ is orthogonal to $d_b$).

In order better to take into account the preservation of the relative position, in step 203_b of the $(k+1)^{th}$ iteration, the term $E_{rl\_k+1}$ corresponding to a sum of two terms determined for all the target triangles $t_{k+1}$ is considered:

$$E_{rl\ k+1} = \sum_{\tilde{t}_{k+1}} \sum_{\tilde{p}_{i,k+1}\in \tilde{t}_{k+1}} \alpha_i(\langle \tilde{p}_{i,k+1}-\tilde{p}_{i,0}, d_b\rangle^2 + \langle \tilde{p}_{i,k+1}-\tilde{p}_{i,0}, d_t\rangle^2) \quad \text{(Form 2}_{k+1}\text{)}$$

The purpose of the two terms of this sum is to prevent the garment from slipping or turning on the skeleton during transfer. For internal vertices (as opposed to those located on the edge of part of the garment) situated in loose regions, a low value is used for $\alpha_i$ (for example, chosen in the range [0, 10] and equal in one embodiment to 0.5), which assists with the preservation of the shape at the expense of minor imprecisions in the preservation of the relative positions. Along borders and seams of the garment (where any twisting or displacement of the garment would be truly visible) and in tight regions, a high value is used for $\alpha_i$ (for example, chosen in the range [10, +∞] and equal in one embodiment to 1000).

Given that the preservation of the relative position does not impose any constraint on the distance between the body of the person and the fabric, in one embodiment no constraint is fixed relative to the component of $\tilde{p}_{i,k+1}-\tilde{p}_{i,0}$ aligned with $d_q$.

In one embodiment, in order better to take into account the fit in tight regions, the term of relative location is increased with a term of fit $E_{fit\_k+1}$, explicitly restricting the corresponding distance:

$$E_{fit\_k+1} = \beta \sum_{\tilde{t}_{k+1}\in F} \sum_{\tilde{p}_{i,k+1}\in \tilde{t}_{k+1}} \langle \tilde{p}_{i,k+1}-\tilde{p}_{i,0}d_q\rangle^2 \quad \text{(Form 3}_{k+1}\text{)}$$

wherein the set F comprises the target triangles situated in the tight regions (or the target triangles each corresponding to a source triangle situated in a tight region); and wherein the constant value of β is chosen in the range [10, +∞] and is, for example, in one embodiment equal to 1000.

Accordingly, in one embodiment, in step 203_b, in order to determine the target triangles $\tilde{t}_{k+1}$, instead of minimizing $E_{shape\_k+1}$, there will be minimized $E_{k+1}=E_{shape\_k+1}+E_{rl\_k+1}+E_{fit\_k+1}$ (or, if only one of the two additional criteria is taken into account, $E_{k+1}=E_{shape\_k+1}+E_{rl\_k+1}$ will be minimized).

In the case where $E_{fit\_k+1}$ is taken into account in $E_{k+1}$, the triangles which are elements of the set F are not taken into account in the terms of $E_{shape\_k+1}$ because, in that case, there is no reason to preserve the normals to those triangles.

Given the degree of freedom provided by varying the distance to the body of the target object person, it is thus possible to preserve simultaneously the shape and the relative location in the adjusted regions.

In one embodiment, the source triangles identified as forming part of a tight region of the source garment are selected as those separated by a distance to the body which is below a given threshold. This criterion can be problematical when the curve of the body increases significantly between the source and target persons. In this case, preserving the tight appearance can increase the Gaussian curve of the garment, rendering production of the garment unlikely. In another embodiment, a technique of selective relaxation is used, relaxing the fit in regions where the normal to the points of the source garment points downwards or sideways. The set F then includes as elements any target triangle such that all the vertices of the corresponding source triangle are situated beyond a given threshold distance of the body of the source person, the normal of the source triangle pointing towards the top of the person.

In one embodiment, in order to prevent collisions between the target garment determined iteratively in step 203 and the body of the target person, the scalar product of the vectors $\tilde{p}_{i,k+1}-p_m$ and $d_q$ is greater than a fixed minimum value ε (typically, the smallest distance between the source garment and the skin of the source person is taken as ε, which is generally equal to the assumed thickness of the fabric), namely $\langle \tilde{p}_{i,k+1}-p_m, d_q\rangle \geq \epsilon$, which amounts to requiring that the target garment is further from the bone than is the skin of the target person.

To that end, the vertices that minimize $E_{k+1}$ are first sought in step 203_b for iteration k+1 without taking account of that constraint. Then the collisions are identified.

In order to identify the collisions, the intersection of the segments $\tilde{p}_{i,k+1}-p_b$ with the target person is determined, and a test is carried out by comparing the target skeleton/current target garment distances with the target skeleton/target person distances. To that end, the point of the garment is reprojected onto the associated bone, which gives a new value at point $p_b$, and the point of the skin $p_m$ is recalculated as being the intersection between the straight line which carries $\tilde{p}_{i,k+1}$–$p_b$ and the skin. The comparison between the distance $(p_b, p_m)$ and the distance $(\tilde{p}_{i,k+1}$–$p_b)$ makes it possible to know if $\tilde{p}_{i,k+1}$ has penetrated beneath the skin. In the case of penetration of the vertex $\tilde{p}_{i,k+1}$, the vertex $\tilde{p}_{i,0}$ is recalculated by projecting the vertex at the distance $\epsilon$ defined above of the point $p_m$ of the target person along the segment $\tilde{p}_{i,kk+1}$–$p_b$, and the highest triangle adjacent to that recalculated vertex $\tilde{p}_{i,0}$ is added to the set F, that triangle being treated as a triangle of tight zones in the calculations which follow. The optimization (step 202) is then repeated. The treatment of the collisions (step 203) is iterated as long as collisions remain.

In one embodiment, the source person comprises several superposed layers of source garments, which are to be adapted to cover a target person. In such a case, each source garment is adapted to the target person in succession, starting with the source garment which is closest to the body of the source person. At each stage, the layers of garments which have already been adapted are considered as forming part of the body of the source/target persons.

In order to obtain a 2D pattern corresponding to a garment adapted to a target person according to the invention, the latter is cut out from the target garment along seams indicated on the source garment (in such a manner as to have the same edges for the patterns). A parameterization method is then used to flatten each part of the garment (for example, ABF++ can be used, see SHEFFER A., LEVY B., MOGILNITSKY M. and BOGOMYAKOV A. 2005, Abf++: fast and robust angle based flattening, ACM Trans. Graph. 24 (April), 311-330).

The source and target surfaces Ss and Sc considered above are defined by meshed triangles. It goes without saying that the invention can be carried out on the basis of surfaces defined by a mesh of planar elementary surfaces comprising all types of planar polygons.

When the elementary surfaces are not triangles, $(P^t)^{-1}$ is pseudo-inverse of the matrix $P^t$.

The steps and criteria described above according to the invention relate to the operations of defining a garment adapted to dimensions of a target person starting from a garment which serves as a model adapted to a source person. They are, of course, wholly transposable to operations of transferring a surface covering a source object to a target object of dimensions other than those of the source object, the surfaces and objects being of any type, for example other than clothing on persons. The points of the skin are then replaced by the points of the mesh of the object and the points of the animated skeleton are replaced by the points of a skeleton internal to the mesh of the object, for example of the medial axis type.

A method according to the invention permits very credible resizing while avoiding the need for intervention by the user (automatic process).

The invention claimed is:

1. A data processing method for transforming a first 3D surface ($S_S$) which is adapted to cover a first object ($O_S$) and is formed of a mesh of first 2D elementary surfaces into a second 3D surface ($S_C$) which is adapted to cover a second object ($O_C$) and is formed of a mesh of second 2D elementary surfaces, said method being characterized in that it comprises a step of iterative processing in which the transformations of the first elementary surfaces into respective second elementary surfaces are determined by carrying out in an iterative manner steps in which:
   (a) in a current $(k+1)^{th}$ iteration step, k being an integer greater than or equal to 0, for each of a plurality of couples comprising a first elementary surface and a second elementary surface derived from a transformation of the first elementary surface and having been obtained in the preceding iteration k, the projection of said second elementary surface on the plane of said first elementary surface is determined, and a current 2D transformation matrix $T_{k+1}^t$ is defined for said couple,
   where $T_{k+1}^t = P_k^{'t}(P^t)^{-1}$ and $P^t = [p_{n+1}-p_i]_{i=1 \ to \ n}$, $P_k^{'t} = [p'_{n+1,k}-p'_{i,k}]_{i=1 \ to \ n}$;
   wherein $p_i$ for i=1 to n, are the vertices of the first elementary surface t of the couple and $p_{n+1}$ is obtained by offsetting the vertex $p_1$ by a normal vector of given norm to said first surface;
   wherein $(P^t)^{-1}$ is the inverse of the matrix $P^t$ when the first elementary surfaces are triangles and is a pseudo-inverse matrix of the matrix $P^t$ otherwise;
   wherein $p'_{i,k}$, for i=1 to n, are the vertices of said projection of the second elementary surface and $p'_{n+1,k}$ is obtained by offsetting the vertex $p'_{1,k}$ of said normal vector;
   (b) the second elementary surfaces obtained for the $(k+1)^{th}$ iteration are determined as those minimizing a function including at least the term $$E_{shape\_k+1} = \sum_{\tilde{t}_{k+1} \in S} \left\| \tilde{P}_{k+1}^t (P^t)^{-1} - T_{k+1}^t \right\|^2,$$

wherein S is a set of second elementary surfaces $\tilde{t}_{k+1}$ determined in step k+1; $T_{k+1}^t$ are the transformation matrices defined in step a/ of the $(k+1)^{th}$ iteration;

$\tilde{P}_{k+1}^t = [\tilde{p}_{n+1,k+1} - \tilde{p}_{i,k+1}]_{i=1,\ldots,n}$;

wherein $\tilde{p}_{i,k+1}$, for i=1 to n, are the vertices of the second elementary surface $\tilde{t}_{k+1}$ as determined in the $(k+1)^{th}$ iteration and $\tilde{p}_{n+1,k+1}$ is obtained by offsetting the vertex $\tilde{p}_{i,k+1}$ by a vector of said given norm normal to said second elementary surface $\tilde{t}_{k+1}$.

2. Data processing method according to claim 1, comprising the following steps carried out for each vertex of a first elementary surface in an initialization step of the iterative processing, in order to define a second elementary surface ($S_C$) for said first elementary surface ($S_S$), the first and second objects each being defined by data defining bone points of an object animated skeleton and object envelope points, an isomorphism function establishing correspondence between said points of the first object and said points of the second object:
   i) a pair of points is determined for each bone of a plurality of bones of the skeleton of the first object, comprising a first point determined as being the point of said bone that is closest to the vertex and comprising a second point determined as being the point of the envelope of the first object that is situated in the segment joining the vertex and said first point, and being closest to said vertex;
   ii) there is selected from said pairs determined for respective bones at least one pair, called the pair of first and second points of reference for said vertex of the first elementary surface, said selected pair corresponding to a minimum of a function including as variables the distance between said vertex of the first elementary surface and the second point of reference of a pair and the scalar product between a unit vector collinear to the bone and the vector joining said vertex and the first point of the pair;

iii) a vertex of the second elementary surface is defined as a function of the point resulting from the application of the isomorphism function to the second point of reference, said resultant point then being offset by a vector parallel to that connecting the two points resulting from the application of the isomorphism function to the first and second points of reference, the norm of said vector being a function of the norm of the vector joining said vertex of the first surface and the second point of reference.

3. Data processing method according to claim 2, according to which in step ii) said function representing the norm is equal to $$\|pm, pi\| \times e^{\frac{\langle v_b, v \rangle^2}{\sigma^2}},$$

wherein $\sigma$ is a constant value, $p_m$ is the second point of a pair, $p_i$ is said vertex of the first surface, $v_b$ is the unit vector collinear to the bone, and $v$ is the vector joining said vertex and the first point of the pair.

4. Data processing method according to claim 2 or 3, according to which in step iii) the vertex of the second surface is defined as being equal to $\tilde{p}_m + \|p_m, p_i\| \cdot v_{bm}$, $p_i$ being said vertex of the first elementary surface;

$\tilde{p}_m$ being the point resulting from the application of the isomorphism function to the second point of reference;

$v_{bm}$ being a unit vector parallel to the segment $[\tilde{p}_b, \tilde{p}_m]$, $\tilde{p}_b$ being the point resulting from the application of the isomorphism function to the first point of reference.

5. Data processing method according to claim 2, according to which, if two reference pairs are selected in step iii, the vertex of the second surface is defined as being equal to $w_1 \cdot \tilde{p}_{i1} + w_2 \cdot \tilde{p}_{i2}$, where $w_1$ and $w_2$ are greater than 0 and $w_1 + w_2 = 1$ $\tilde{p}_{i1} = \tilde{p}_{m1} + \|p_{m1}, p_i\| \cdot v_{bm1}$ and $\tilde{p}_{i2} = \tilde{p}_{m2} + \|p_{m2}, p_i\| \cdot v_{bm2}$;

$p_i$ being said vertex of the first elementary surface;

$\tilde{p}_{mn}$ being the point resulting from the application of the isomorphism function to the second point of reference of the $n^{th}$ reference pair, n=1 or 2;

$v_{bmn}$ being a unit vector parallel to the segment $[\tilde{p}_{bn}, \tilde{p}_{mn}]$, $\tilde{p}_{bn}$ is the point resulting from the application of the isomorphism function to the first point of reference of the $n^{th}$ reference pair.

6. Data processing method according to claim 5, according to which $$w_1 = \frac{\arctan\left((5*(z-0.5) + \frac{\pi}{2}\right)}{\pi}$$

wherein z is the coordinate of the projection of the vertex $p_i$, on the segment connecting the two points of reference $p_{b1}$ and $p_{b2}$, $p_{b1}$ being considered as the zero coordinate point.

7. Data processing method according to claim 2, according to which, in step b/, the function to be minimized includes at least $E_{shape\_k+1} + E_{rl\_k+1}$, where $$E_{rl\_k+1} = \sum_{\tilde{t}_{k+1}} \sum_{\tilde{p}_{i,k+1} \in \tilde{t}_{k+1}} \alpha_i (\langle \tilde{p}_{i,k+1} - \tilde{p}_{i,0}, d_b \rangle^2 + \langle \tilde{p}_{i,k+1} - \tilde{p}_{i,0}, d_t \rangle^2),$$

wherein T is a set of second elementary surfaces $\tilde{t}_{k+1}$ determined in iteration k+1;

each $\tilde{p}_{i,0}$ is a second elementary surface vertex defined in iii/ for a vertex $p_i$, of a first elementary surface;

$\alpha_i$ is a value which is constant for the vertices $\tilde{p}_{i,k+1}$ of a same second elementary surface $\tilde{t}_{k+1}$;

$d_b$ is the unit vector collinear to the bone for which the selected pair of first and second points of reference has been determined, and, $d_q$ being the unit vector collinear to $(p_b, \tilde{p}_{i,0})$, the unit vector $d_t$ is equal to the vector product of the vectors $d_b$ and $d_q$.

8. Data processing method according to claim 7, according to which the values of $\alpha_i$, for elementary surfaces in adjusted zones of the surface on the object are chosen in the range [0, 10].

9. Data processing method according to claim 8, according to which the values of $\alpha_i$ are chosen in the range $[10; +\infty]$ in the other zones of said surface.

10. Data processing method according to claim 2, according to which, in step b/, the function to be minimized includes at least $E_{shape\_k+1} + E_{fit\_k+1}$, where $$E_{fit\_k+1} = \beta \sum_{\tilde{t}_{k+1} \in F} \sum_{\tilde{p}_{i,k+1} \in \tilde{t}_{k+1}} \langle \tilde{p}_{i,k+1} - \tilde{p}_{i,0}, d_q \rangle^2$$

wherein $\beta$ is a constant,

F is a set of second elementary surfaces $\tilde{t}_{k+1}$ determined in iteration k+1 and situated in adjusted zones of the surface on the object, said second elementary surfaces determined as being found in F then being removed from the set S;

each $\tilde{p}_{i,0}$ is a second elementary surface vertex defined in iii/ for the vertex $p_i$, of a first elementary surface;

$d_b$ is the unit vector collinear to the bone for which the selected pair of first and second points of reference has been determined, and, $d_q$ being the unit vector collinear to $(p_b, \tilde{p}_{i,0})$, the unit vector $d_t$ is equal to the vector product of the vectors $d_b$ and $d_q$.

11. Data processing method according to claim 10, according to which $\beta$ is a constant chosen in $[10; +\infty]$.

12. Data processing device (1) for transforming a first 3D surface ($S_S$) which is adapted to cover a first object ($O_S$) and is formed of a mesh of first 2D elementary surfaces into a second 3D surface ($S_C$) which is adapted to cover a second object ($O_C$) and is formed of a mesh of second 2D elementary surfaces, said processing device being adapted to determine transformations of the first elementary surfaces into respective second elementary surfaces and comprising:

a supervisor adapted to run iteratively a set of modules comprising a first updating module and a second updating module;

the first updating module adapted to, in a $(k+1)^{th}$ iteration operation, k being an integer greater than or equal to 0, for each of a plurality of couples comprising a first elementary surface and a second elementary surface derived from a transformation of the first elementary surface and having been delivered by the second updating module following the $k^{th}$ iterative operation of the supervisor, determine the projection of said second elementary surface on the plane of said respective elementary surface and define a current 2D transformation matrix $T_{k+1}^t$ for said couple, where $T_{k+1}^t = P_k^{\prime n}(P^t)^{-1}$ and $P^t = [p_{n+1} - p_i]_{i=1 \text{ to } n}$, $P_k^{\prime n} = [p'_{n+1,k} - p'_{i,k}]_{i=1 \text{ to } n}$;

wherein $p_i$, for i=1 to n, are the vertices of the first elementary surface t of a couple and $p_{n+1}$ is obtained by offsetting the vertex $p_1$ by a vector normal to said first surface, of given norm;

wherein $(p^t)^{-1}$ is the inverse of the matrix $p^t$ when the first elementary surfaces are triangles and is a pseudo-inverse matrix of the matrix $p^t$ otherwise;

wherein $p'_{i,k}$, i=1 to n, are the vertices of said projection of the second elementary surface and $p'_{n+1,k}$ is obtained by offsetting the vertex $p'_{1,k}$ of said normal vector;

the second updating module adapted to, in a $(k+1)^{th}$ iteration operation by the supervisor, k being an integer greater than or equal to 0, determine the second elementary surfaces obtained for the $(k+1)^{th}$ iteration as those minimizing a function including at least the term $$\sum_t \left\| \tilde{P}_{k+1}^t (P^t)^{-1} - T_{k+1}^t \right\|^2,$$

wherein $T_{k+1}^t$ are the transformation matrices defined by the first module in the $(k+1)^{th}$ iteration operation by the supervisor;

where $\tilde{P}_{k+1}^t = [\tilde{p}_{n+1,k+1} - \tilde{p}_{i,k+1}]_{i=1,\ldots,n'}$ wherein $\tilde{p}_{i,k+1}$, for i=1 to n, are the vertices of the second elementary surface of the couple as determined in the $(k+1)^{th}$ iteration and $\tilde{p}_{n+1,k+1}$ is obtained by offsetting the vertex $\tilde{p}_{1,k+1}$ by a vector normal to said second surface, of given norm.

* * * * *